(12) United States Patent
Henderson

(10) Patent No.: US 9,984,489 B2
(45) Date of Patent: May 29, 2018

(54) FLUID DYNAMICS FRAMEWORK FOR ANIMATED SPECIAL EFFECTS

(75) Inventor: Ronald D. Henderson, Sierra Madre, CA (US)

(73) Assignee: DreamWorks Animation L.L.C., Universal City, CA (US)

( * ) Notice: Subject to any disclaimer, the term of this patent is extended or adjusted under 35 U.S.C. 154(b) by 561 days.

(21) Appl. No.: 13/192,405

(22) Filed: Jul. 27, 2011

(65) Prior Publication Data

US 2013/0027407 A1    Jan. 31, 2013

(51) Int. Cl.
G06T 13/00    (2011.01)
G06T 13/60    (2011.01)

(52) U.S. Cl.
CPC .......... *G06T 13/60* (2013.01); *G06T 2210/24* (2013.01); *G06T 2210/56* (2013.01)

(58) Field of Classification Search
CPC .. G06T 13/60; G06T 2210/56; G06T 2210/24
USPC ......................................................... 345/473
See application file for complete search history.

(56) References Cited

U.S. PATENT DOCUMENTS

| | | | |
|---|---|---|---|
| 5,848,260 A * | 12/1998 | Chen et al. ........................ | 703/5 |
| 5,877,777 A | 3/1999 | Colwell | |
| 5,910,902 A * | 6/1999 | Molvig et al. .................... | 703/6 |
| 6,089,744 A * | 7/2000 | Chen et al. ........................ | 703/2 |
| 6,266,071 B1 | 7/2001 | Stam et al. | |
| 7,372,463 B2 * | 5/2008 | Anand .......................... | 345/473 |
| 7,479,963 B2 | 1/2009 | Lischinski et al. | |
| 7,565,276 B2 | 7/2009 | Song et al. | |
| 7,724,258 B2 | 5/2010 | Ebert et al. | |
| 7,739,479 B2 | 6/2010 | Bordes et al. | |
| 8,289,327 B1 * | 10/2012 | Horvath ........................ | 345/428 |

(Continued)

FOREIGN PATENT DOCUMENTS

CN    101944144 A    1/2011

OTHER PUBLICATIONS

Thibault, J. C., & Senocak, I., (Jan. 2009), "CUDA implementation of a Navier-Stokes solver on multi-GPU desktop platforms for incompressible flows", Proceedings of the 47th AIAA Aerospace Sciences Meeting (pp. 2009-2758).*

(Continued)

*Primary Examiner* — Yingchun He
(74) *Attorney, Agent, or Firm* — Dentons US LLP

(57) ABSTRACT

An animated special effect is modeled using a fluid dynamics framework system. The fluid dynamics framework for animated special effects system accepts volumetric data as input. Input volumetric data may represent the initial state of an animated special effect. Input volumetric data may also represent sources, sinks, external forces, and/or other influences on the animated special effect. In addition, the system accepts input parameters related to fluid dynamics modeling. The input volumes and parameters are applied to the incompressible Navier-Stokes equations as modifications to the initial state of the animated special effect, as modifications to the forcing term of a pressure equation, or in the computations of other types of forces that influence the solution. The input volumetric data may be composited with other volumetric data using a scalar blending field. The solution of the incompressible Navier-Stokes equations models the motion of the animated special effect.

18 Claims, 9 Drawing Sheets

(56) References Cited

U.S. PATENT DOCUMENTS

| | | | |
|---|---|---|---|
| 8,725,476 B1* | 5/2014 | Losasso Petterson | 703/9 |
| 2005/0225552 A1* | 10/2005 | Anand | 345/473 |
| 2005/0253854 A1* | 11/2005 | Lischinski et al. | 345/474 |
| 2006/0074610 A1* | 4/2006 | Rasmussen et al. | 703/2 |
| 2007/0219766 A1 | 9/2007 | Duggleby et al. | |
| 2007/0239414 A1* | 10/2007 | Song et al. | 703/9 |
| 2008/0166022 A1 | 7/2008 | Hildreth | |
| 2009/0040220 A1* | 2/2009 | Gibbs et al. | 345/424 |
| 2009/0171596 A1 | 7/2009 | Houston | |
| 2010/0185420 A1* | 7/2010 | Ding | 703/2 |
| 2010/0250213 A1 | 9/2010 | Kim et al. | |

OTHER PUBLICATIONS

Robert Bridson and Matthias Müller-Fischer, Aug. 2007, "Fluid simulation: SIGGRAPH 2007 course notes", ACM SIGGRAPH 2007 courses (SIGGRAPH '07), ACM, New York, NY, USA, pp. 1-81.*
Jonathan M. Cohen, Sarah Tariq, and Simon Green, Feb. 19-21, 2010, "Interactive fluid-particle simulation using translating Eulerian grids", Proceedings of the 2010 ACM SIGGRAPH symposium on Interactive 3D Graphics and Games (I3D '10), ACM, New York, NY, USA, pp. 15-22.*
Shannon Drone, 2007, "Real-time particle systems on the GPU in dynamic environments", ACM SIGGRAPH 2007 courses (SIGGRAPH '07), ACM, New York, NY, USA, pp. 80-96.*
Horvath, Christopher, and Willi Geiger, "Directable, high-resolution simulation of fire on the GPU", ACM Transactions on Graphics (TOG), vol. 28, No. 3, 8 pages, ACM, Jul. 2009.*
Frederic Pighin, Jonathan M. Cohen, and Maurya Shah, 2004, "Modeling and editing flows using advected radial basis functions", Proceedings of the 2004 ACM SIGGRAPH/Eurographics symposium on Computer animation (SCA '04), Eurographics Association, Aire-la-Ville, Switzerland, Switzerland, pp. 223-232.*
Schmid, Jan, "An Optimized Fluid Simulation Pipeline on the GPU", Bachelor Thesis, Swiss Federal mlnstitue of Technology Zurich, Sep. 9, 2009, 43 pages.*
Gary D. Yngve, James F. O'Brien, and Jessica K. Hodgins, 2000. ,"Animating explosions", Proceedings of the 27th annual conference on Computer graphics and interactive techniques(SIGGRAPH '00), ACM Press/Addison-Wesley Publishing Co., New York, NY, USA, pp. 29-36.*
Dyman, Richard, "Client Server vs. Mainframe Processing," DePaul University, 1999, retrieved from: http://condor.depaul.edu/elliott/shared/projects-archive/DS420Spring99/indiana/.*
Anonymous, "Difference between a PC and Server," Sep. 24, 2009, retrieved from: http://www.differencebetween.net/technology/difference-between-pc-and-server/.*
Anonymous, "Density of air," Wikipedia, retrieved from: http://en.wikipedia.org/wiki/Density_of_air.*
Gates, W. F. (1994). Interactive flow field modeling for the design and control of fluid motion in computer animation (Doctoral dissertation, University of British Columbia).*
Galin, Eric, Antoine Leclercq, and Samir Akkouche, "Morphing the blobtree," Computer Graphics Forum, vol. 19, No. 4, pp. 257-270. Blackwell Publishers, 2000.*
Zhao, Ye, Xiaoming Wei, Zhe Fan, Arie Kaufman, and Hong Qin. "Voxels on fire [computer animation]." In Visualization, 2003. VIS 2003. IEEE, pp. 271-278. IEEE, 2003.*
Kelager, Lagrangian fluid dynamics using smoothed particle hydrodynamics, MS Thesis, Univ. Copenhagen, 2006, downloaded @ http://image.diku.dk/projects/media/kelager.06.pdf.*
Koehler, "Interactive Simulation of Clouds Based on Fluid Dynamics", Thesis Jun. 2009.*
Yin et al. "A new parallel strategy for two-dimensional incompressible flow simulations using pseudo-spectral methods", Journal of Computational Physics, 210, p. 325-341, 2005.*
Nolan Goodnight "CUDA/OpenGL Fluid Simulation", by NVIDIA Apr. 2007.*
Jared Schaber "CFD CUDA: Accessing the power of a GPU for use in 3-D simulations", downloaded @ http://new.math.uiuc.edu/oldnew/MA198-2008/schaber2/ online since 2008.*
Stam "Interacting with Smoke and Fire in Real Time", Communications of The ACM Jul. 2000, vol. 43 No. 7.*
"FUMEFX" Sitnisati, Ver. 2.1, Available on internet, retrieved on Oct. 28, 2011, 3 pages, available at: http://www.afterworks.com/FumeFX/Overview.asp.
Bancroft et al., "FAST*: A Multi-Processed Environment for Visualization of Computational", First IEEE Conference on Visualization, Oct. 23-26, 1990, pp. 14-27.
Bolz et al., "Sparse Matrix Solvers on the GPU: Conjugate Gradients and Multigrid", Proceedings of SIGGRAPH, 2003, 8 pages.
Chen et al., "Real-Time Simulation and Rendering of 3D Smoke on GPU Programme", Image and Signal Processing, 2009. CISP '09. 2nd International Congress at Tianjin, School of Computer Science &Technology, Soochow University, Suzhou, China, Oct. 19, 2009, 5 pages.
Cohen et al., "Interactive Fluid-Particle Simulation using Translating Eulerian Grids", NVIDIA, 8 pages., 2010.
Fedkiw et al., "Visual Simulation of Smoke", Proceedings of ACM SIGGRAPH, Aug. 2001, Stanford University, 2001, pp. 15-22.
Gupta et al., "Legendre Fluids: A Unified Framework for Analytic Reduced Space Modeling and Rendering of Participating Media", Eurographics/ACM SIGGRAPH Symposium on Computer Animation, 2007, 9 pages.
Kwatra et al., "Fluid in Video: Augmenting Real Video with Simulated Fluids", Eurographics, vol. 27, No. 3, 2008, 10 pages.
Ng et al., "Development Status of Indigenous Computational Fluid Dynamics Software for Arbitrary Complex Geometry", Journal—The Institution of Engineers, Malaysia, vol. 66, No. 4, Dec. 2005, pp. 15-22.
Rørbech, Marinus "Real-Time Simulation of 3D Fluid Using Graphics Hardware", Masters Thesis in Computer Science, Jul. 1, 2004, pp. 1-139.
Selle et al., "An Unconditionally Stable MacCormack Method", Journal of Scientific Computing, vol. 35, Jun. 29, 2007, pp. 1-32.
Stam, Jos, "Stable Fluids", 8 pages., 1999.
Steinhoff et al., "Modification of the Euler Equations for "Vorticity Confinement": Application to the Computation of Interacting Vortex Rings", Physics of Fluids, vol. 6, No. 8, Aug. 1994, pp. 2738-2744.
Yoshida et al., "Modelling of Smoke Flow Taking Obstacles into Account", Computer Graphics and Applications, 2000. Proceedings. The Eighth Pacific Conference at Department of Information Science,University of Tokyo, Oct. 5, 2000, 9 pages.
Office Action Received for Chinese Patent Application No. 2012102617721, dated Aug. 4, 2015, 33 pages (17 pages of English translation and 16 pages of Official copy).
Notice of Allowance received for Chinese Patent Application No. 201210261772.1, dated May 26, 2016, 3 pages (2 pages of English Translation and 1 page of Official Copy).
Office Action Received for Chinese Patent Application No. 201210261772,1 dated Feb. 15, 2016, 7 pages (4 pages of English Translation and 3 pages of Official Copy).

* cited by examiner

FLUID DYNAMICS FRAMEWORK FOR ANIMATED SPECIAL EFFECTS

BACKGROUND

1. Field

The present disclosure relates generally to computer graphics, and more specifically to the animation of special effects such as dust, smoke, and/or explosions using a fluid dynamics framework.

2. Description of Related Art

In the field of computer animation, animated special effects such as smoke, fire, dust, explosions, and the like are frequently modeled using fluid simulation because fluid simulations produce realistic models of such animated special effects. For example, FIG. 1 depicts an exemplary animation scene with a large dust cloud 102 that is modeled using fluid simulation.

Computer-implemented fluid simulations are typically based on the incompressible Navier-Stokes equations, which are partial differential equations that govern the properties of a moving fluid. The outcome of a fluid simulation that is based on the Navier-Stokes equations may be affected by manipulating the inputs to the Navier-Stokes equations, and by manipulating the way in which the partial differential equations are solved.

During the production of a computer animated feature film, a significant amount of time is spent on the modeling of animated special effects similar to dust cloud 102. Thus, improvements in the fluid simulation tools available to animation artists for creating animated special effects, especially in the areas of computational efficiency, visual quality, setup flexibility, and artistic control, are instrumental in improving the visual quality of a computer animated feature film while reducing its associated costs.

BRIEF SUMMARY

The fluid dynamics framework for animated special effects system (FLUX) described herein is based on the time integration of the incompressible Navier-Stokes equations. In one embodiment, inputs to the Navier-Stokes equations are represented as discrete volumes sampled on a regular grid. An explicit divergence control field is incorporated into the solution. A family of unconditionally stable semi-Lagrangian advection schemes is used to determine motion of the fluid. A set of user-specified scalar fields representing the visual quantities of interest (smoke, fire, dust, etc.) are advected using the computed fluid motion. Incompressibility constraints, diffusive and dissipative terms are treated in the solution in order to apply fast computer-implemented techniques for solving elliptic systems.

In one embodiment, the FLUX system accesses a first set of volumetric data representing the special effect in an initial state, a second set of volumetric data representing a velocity field, and a third set of volumetric data representing an influence on the special effect. The second set of volumetric data may describe advection of the special effect. Motion of the animated special effect is determined using the first set of volumetric data, the second set of volumetric data, the third set of volumetric data, and the incompressible Navier-Stokes equations. In determining the motion, the FLUX system applies the third set of volumetric data to influence the solution of the incompressible Navier-Stokes equations. The motion of the animated special effect is stored as a fourth set of volumetric data.

In one embodiment, the third set of volumetric data represents a source for the animated special effect and comprises a scalar field for the value of the source and a scalar field for blending the source with an existing value from the first set of volumetric data. A fourth set of volumetric data is further determined using a linear combination of: the scalar source field, the scalar blending field, and the first set of volumetric data. The linear combination is applied as a modification to the initial state of the animated special effect.

In one embodiment, the third set of volumetric data represents a collision between the animated special effect and another animated object and comprises a vector field and a scalar field for blending the vector field with an existing value from the second set of volumetric data, and the fourth set of volumetric data is further determined using a linear combination of: the vector field, the scalar blending field, and the second set of volumetric data.

In one embodiment, the third set of volumetric data represents a divergence field that influences the special effect, and the third set of volumetric data is applied to the incompressible Navier-Stokes equations as a modification to the forcing term of a pressure equation. In one embodiment, the third set of volumetric data represents a vector field used to drive the motion of the special effect, and the third set of volumetric data is applied to the incompressible Navier-Stokes equation as a force field.

DETAILED DESCRIPTION

The following description sets forth exemplary methods, parameters and the like. It should be recognized, however, that such description is not intended as a limitation on the scope of the present disclosure but is instead provided as a description of exemplary embodiments.

Figure 1:
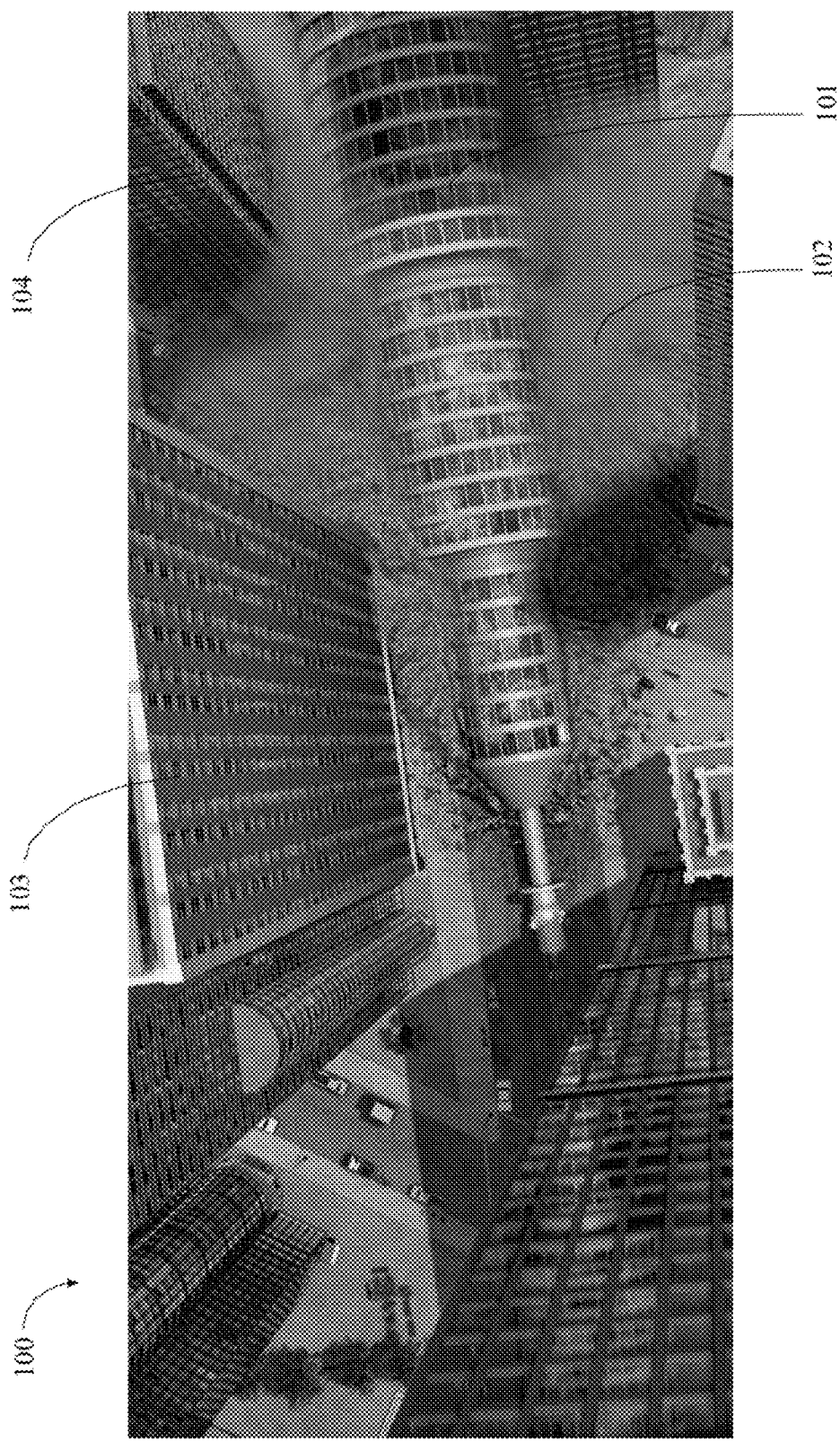
FIG. 1 is a screen shot depicting an exemplary animation scene produced using an embodiment of the fluid dynamics framework for animated special effects (FLUX) system.

FIG. 1 depicts exemplary animation scene 100 produced using an embodiment of the fluid dynamics framework for animated special effects (FLUX) system and shows tall building 101, which has fallen onto the ground. The impact of fallen building 101, with the ground forms dust cloud 102, with the areas of impact between building 101 and the ground (not shown) acting as the sources of dust cloud 102. As a viewer of animation scene 100 might expect, dust cloud 102 changes in spatial displacement (i.e., shape) over time.

For example, dust cloud 102 may expand initially and dissipate over time. Further, dust cloud 102 propagates through open areas in animation scene 100 according to the layout of animation scene 100 as defined by other objects in animation scene 100, such as buildings 103 and 104. That is to say, the shape of dust cloud 101 may account for interactions, such as collisions, between itself and other objects in animation scene 100.

For the sake of clarity and convenience, exemplary embodiments of the FLUX system are described with reference to modeling a computer-generated special effect similar to dust cloud 102. It should be recognized, however, that the FLUX system is a generalized framework for animated special effects that can be used to model other animated special effects. For example, the FLUX system can model smoke, fire, dust, explosions, vapor, and so forth. The FLUX system can also model quantities that are less tangible and/or less visible, such as the temperature of air around a heat source, the color of dust particles in a dust cloud, and so forth. Thus, the examples of animated special effects given herein are not intended to limit the uses of the FLUX system.

The FLUX system comprises a generalized transport component and a fluid dynamics component. The generalized transport component of the FLUX system accesses volumetric data as input. The fluid dynamics component of the FLUX system models the motion (e.g., size and shape) of an animated special effect by integrating, over time, the incompressible Navier-Stokes equations by incorporating the input volumetric data.

As used here, volumetric data refers to a format for describing and storing data with respect to a regular, discrete uniform grid in one or more dimensions. For example, a volumetric data set may be used to describe and to store the spatial layout of an animated special effect, such as a dust cloud. The spatial layout of the dust cloud may be associated with a regular, discrete uniform grid in three dimensions. Grid points of the grid may correspond to locations on the dust cloud. A value may be assigned to a grid point to represent the amount of dust present in a corresponding location of the dust cloud. The values associated with the grid may be stored in one or more linear arrays in memory. The data represented by such linear arrays are referred to as volumetric data. Further, the discrete elements in the volumetric data set (which correspond to grid points) are referred to as volume elements, or voxels.

Figure 2:
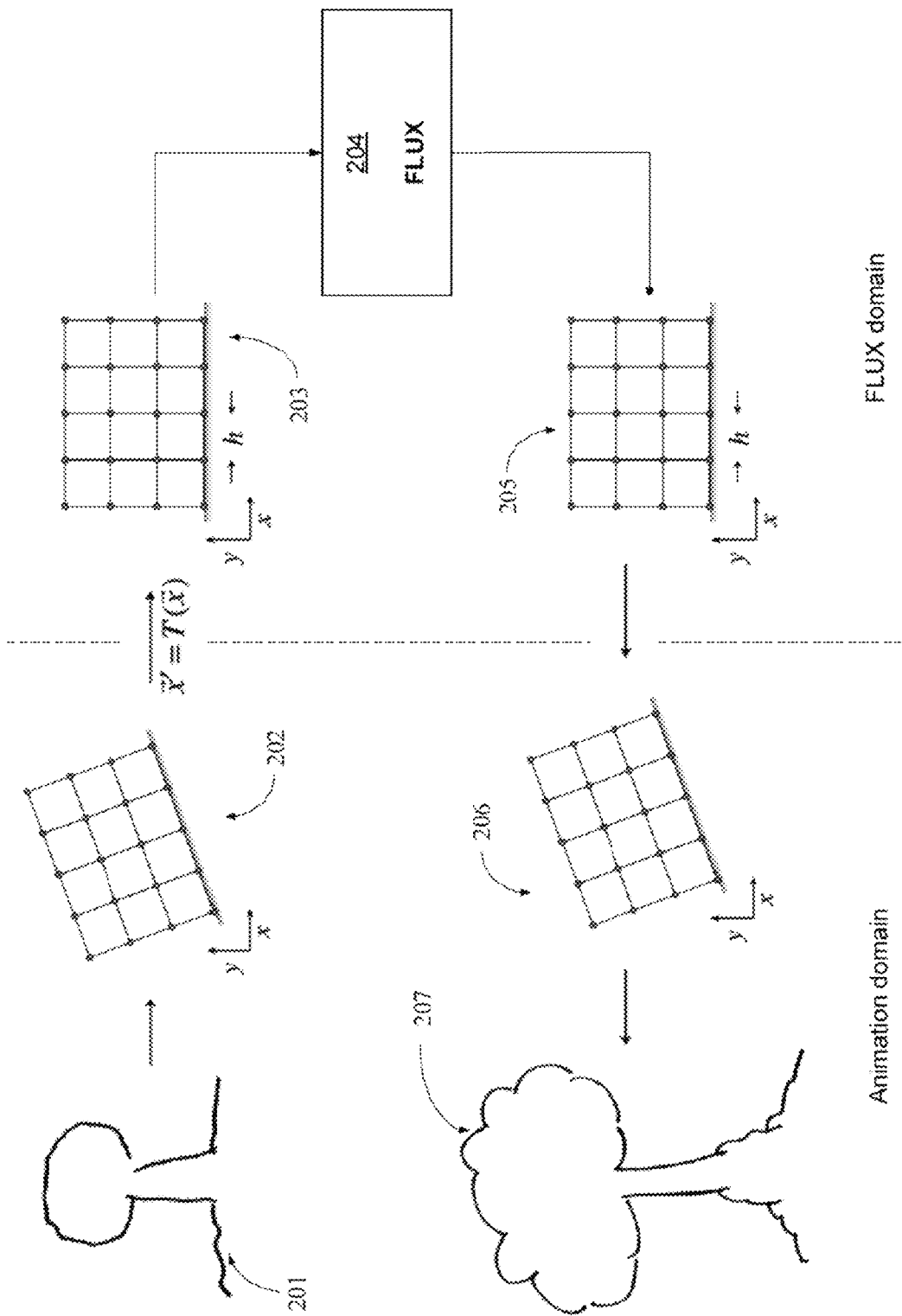
FIG. 2 depicts exemplary volumetric data processed by the FLUX system.

FIG. 2 illustrates an exemplary dust cloud 201 that is associated with grid 202. Although FIG. 2 is shown in two dimensions for the sake of simplicity, one of ordinary skill in the art would appreciate that grids (and volumetric data describing grids) may include additional dimensions. Grid 202 includes a number of grid points with uniform grid spacing h that represent the spatial layout of dust cloud 201 in an animation domain. Grid 202 (animation domain) may be transformed into grid 203 using linear transformation T($\vec{x}$). Grid 203 represents the dust cloud in a different domain, referred to as the FLUX domain. The use of domain-specific volume data provides certain advantages. For example, grid 202 (animation domain) may represent dust cloud 201 at a higher resolution, while grid 203 (FLUX domain) may represent dust cloud 201 at a lower resolution. In another example, grid 203 (FLUX domain) may contain only select portions of grid 202 (animation domain). As one might expect, the modeling of a reduced amount of data and/or data at a lower resolution requires less time.

The volumetric data associated with grid 203 is accessed by exemplary FLUX system 204. Using the volumetric data associated with grid 203 and other input data, exemplary FLUX system 204 produces output grid 205, which represents an expanded dust cloud 207. Grid 205 (FLUX domain) may be transformed to grid 206 (animation domain) for final rendering as dust cloud 207. Note, different linear transformations may be used to map different sets of volumetric data to and from the FLUX domain.

It should be noted that, for purposes of consistency in this disclosure, quantities represented by $\vec{x}$ if (or as functions $\vec{x}$) are quantities that may be described using volumetric data. Further, grid points associated with the edge of a domain (e.g., animation domain) coincide with the physical boundaries of the domain.

The use of a generalized form of input data (e.g., volumetric data) allows the FLUX system to consider, in its modeling of an animated special effect, any information as input as long as the information can be represented using volumetric data. Information that may be accessed by the FLUX system in volumetric form includes the initial state of an animated special effect that is to be modeled. For example, an input volume may contain a scalar field that represents the spatial layout of a dust cloud at a given time interval (e.g., t=0), the initial fluid velocity, or the initial state of any other scalar fields of interest.

In addition to the initial state of an animated special effect, the FLUX system may also access, as input, volumetric data representing influences on the animated special effect. For example, an input volume may contain a scalar field that represents emission (i.e., a source) or absorption (i.e., a sink) of dust. Further, volumetric data representing collisions and external forces acting on the animated special effect may be accessed by the FLUX system. The FLUX system may also access scalar parameters, provided by an animation artist, that control the modeling of animated special effect. User-provided scalar parameters may represent, for example, dissipation and diffusion rates that control the motion of an animated special effect over time. The FLUX system may also access other parameters, provided by an animation artist, that define various forms of interaction between an input volume and the velocity of the animated special effect that is to be modeled. For example, buoyancy forces and gradient forces generated from an input volume can influence the modeling of the motion of an animated special effect. The FLUX system processes input volumes and parameters in order to produce a motion field that is used to model the animated special effect. In some embodiments, all input fields are considered by the FLUX system in the modeling of an animated special effect.

An animated special effect may be modeled with one or more scalar volumes. For example, a dust cloud may require only a single output volume representing the dust. An explosive fire ball may require output volumes for smoke, heat, and fuel. An explosion involving separate quantities (e.g., blue smoke and red smoke) may require a separate volume for each quantity. The FLUX system may model an animated special effect with more than one (and up to any arbitrary number of) scalar volumes. That is, other than practical limits imposed by available computing resources, the FLUX system does not itself limit the number of scalar volumes that compose an animated special effect.

1. Exemplary Process of the FLUX System

Figure 3:
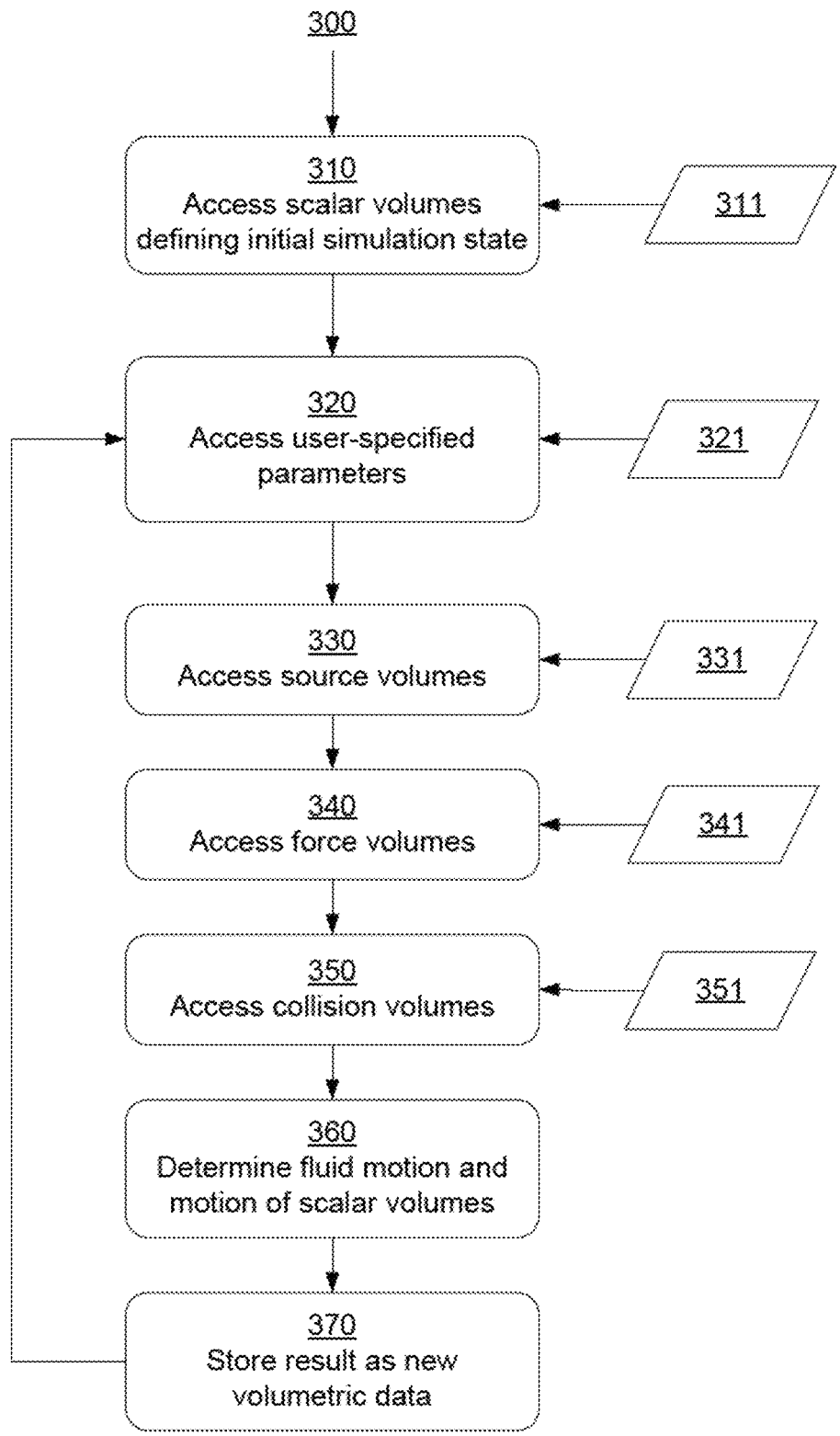
FIG. 3 is a block diagram depicting an exemplary process used by an embodiment of the FLUX system.

FIG. 3 depicts exemplary FLUX process 300 for modeling an animated special effect using an embodiment of the FLUX system. FLUX process 300 may be preceded by other computer animation processes. For example, conversion of geometry representing the initial shape of a dust cloud into volumetric form may be created in a preceding process. FLUX process 300 also may be followed by other computer animation processes. For example, once FLUX process 300 completes the modeling of a dust cloud, a subsequent animation process may render the modeled dust cloud as an image to be composited with other objects in an animation scene.

At step 310 of FLUX process 300, the FLUX system accesses volumetric data 311 that represents the initial state of volumes to be modeled by FLUX process 300. An accessed set of volumetric data may include, for example, a number of scalar fields $\varphi_i$ that represent the initial state of each element of the animated effect. As discussed above, the scalar fields $\varphi_i$ may describe various quantities such as dust, smoke, temperature, fuel, color components, and so forth.

At step 320, FLUX process 300 may access a set of user-specified parameters 321 that control the fluid dynamics modeling of the scalar fields $\varphi_i$. The user-specified parameters may represent dissipation rate, diffusion rate, buoyancy force magnitude, gradient force magnitude, and similar fluid dynamics parameters. At step 330, FLUX process 300 may access a set of volumetric data 331 that defines source terms for the scalar fields $\varphi_i$. At step 340, FLUX process 300 may access a set of volumetric data 341 that defines force fields that influence the fluid velocity $\vec{u}(\vec{x},t)$. At step 350, FLUX process 300 may access a set of volumetric data 351 that represents interaction between the fluid (i.e., the animated special effect) and other objects in the FLUX domain. Volumetric data 351 may be described in terms of a new target fluid velocity $\vec{u}(\vec{x},t)$.

Through steps 310-350, FLUX process 300 accesses input data (e.g., volumes and parameters) required for simulating an animated special effect. At step 360, FLUX process 300 determines the motion of scalar fields $\varphi_i$ (accessed at step 310) based on the accessed input data. New volumes representing the motion of scalar fields $\varphi_i$ are stored at step 370.

Under the principles of fluid dynamics, the motion of a fluid may be determined by the solution of the incompressible Navier-Stokes equations:

$$\nabla \cdot \vec{u} = 0 \qquad \text{(EQ. 1)}$$

$$\frac{\partial \vec{u}}{\partial t} + (\vec{u} \cdot \nabla)\vec{u} = -\frac{1}{\rho}\nabla p + \nu \nabla^2 \vec{u} + \vec{f} \qquad \text{(EQ. 2)}$$

where $\vec{u}$ represents fluid velocity, $\rho$ represents fluid density, p represents pressure, $\gamma$ represents a velocity dissipation rate or drag force, and $\nu$ represents kinematic viscosity of a fluid, while $\vec{f}(\vec{x},t)$ represents an arbitrary force per unit mass acting on the fluid.

The motion, over time, of a given scalar field $\varphi_i(\vec{x},t)$ (e.g., a dust cloud) accessed at step 310 may be determined by solving the general transport system governed by EQ. 3 while complying with the requirements of EQS. 1 and 2:

$$\frac{\partial \phi_i}{\partial t} + (\vec{u} \cdot \nabla)\phi_i = -\gamma_i \phi_i + u_i \nabla^2 \phi_i + E_i \qquad \text{(EQ. 3)}$$

where constant $\mu_i$ describes the diffusion of $\varphi_i$, constant $\gamma_i$ describes the dissipation of $\varphi_i$, and $E_i(\vec{x},t)$ indicates an emission (by a source) or absorption (by a sink) of $\varphi_i$.

EQS. 2 and 3 are coupled to each other by the velocity field $\vec{u}$ and force field $\vec{f}$. The motion of an animated special effect may be influenced by applying different force fields $\vec{f}$ that depend on the value of scalar fields $\varphi_i$. FLUX process 300 may access several types of force fields that are useful for influencing animated special effects at step 340. For example, a general buoyancy force can be defined to mimic the effects of thermal buoyancy and/or variable density of the dust cloud, as:

$$\vec{f}_{buoy} = \beta_i \varphi_i \vec{g} \qquad \text{(EQ. 4)}$$

where $\beta_i$ is a scalar that represents the magnitude of contribution from scalar field $\varphi_i$ in the $\vec{g}$ direction.

A gradient force can also be defined to produce a movement of the dust cloud along the gradients of scalar field $\varphi_i$:

$$\vec{f}_{grad} = -\eta_i \nabla \varphi_i \qquad \text{(EQ. 5)}$$

where $\eta_i$ is a coefficient that relates the magnitude of the gradient of $\varphi_i$ to the magnitude of the applied force.

An arbitrary vector field $\vec{\psi}(\vec{x},t)$ can also be used to provide a spatially varying external force that is dependent on scalar field $\varphi_i$:

$$\vec{f}_{ext} = \alpha_i \varphi_i \vec{\psi} \qquad \text{(EQ. 6)}$$

where $\alpha_i$ is a scalar parameter that controls the magnitude of the force.

Further, a velocity dissipation force can be defined as:

$$\vec{f}_{drag} = -\gamma \vec{u} \qquad \text{(EQ. 7)}$$

The forces defined by EQS. 4-7 ($\vec{f}_{buoy}$, $\vec{f}_{grad}$, $\vec{f}_{ext}$, and $\vec{f}_{drag}$) may be incorporated into EQ. 2 alone or in combination in order to produce an animated special effect of the desired artistic effect. Specifically, the force field $\vec{f}$ of EQS. 2 may be expressed as:

$$\vec{f} = -\gamma \vec{u} + \sum_{i=1}^{m} \alpha_i \phi_i \vec{\psi} + \beta_i \phi_i \vec{g} - \eta_i \nabla \phi_i \qquad \text{(EQ. 8)}$$

FLUX process 300 utilizes the values of the user-specified parameters accessed at step 320, which may include data representing $\gamma$, $\alpha_i$, $\vec{\psi}(\vec{x},t)$, $\beta_i$, $\vec{g}$, and/or $\eta_i$, in order to incorporate one or more of the force fields described by EQ. 8 into EQ. 2.

The modeling of velocity field $\vec{u}^n \approx \vec{u}(\vec{x}, n\Delta t)$ and scalar field $\varphi_i^n \approx \varphi(\vec{x}, n\Delta t)$ over a time step $\Delta t$ at step 360 yields $\vec{u}^{n+1}$ and $\varphi_i^{n+1}$, which represent the animated special effect at the next output time interval. At step 360, FLUX process 300 performs the time integration of $\vec{u}^{n+1}$ and $\varphi_i^{n+1}$ in stages:

$$\vec{u}^{(0)} = \text{advect}(\vec{u}^n, \Delta t, \vec{u}^n) + \Delta t \vec{f}^n \qquad \text{(EQ. 9)}$$

$$\vec{u}^{(1)} = \vec{u}^{(0)} - \Delta t \frac{1}{\rho} \nabla p \qquad \text{(EQ. 10)}$$

-continued $$\vec{u}^{n+1} = \vec{u}^{(1)} + \nu\Delta t\nabla^2\vec{u}^{n+1} - \gamma\Delta t\vec{u}^{n+1} \qquad \text{(EQ. 11)}$$

The velocity dissipation force γ, if defined, is separated from the general force equation ($\vec{f}$) and is handled implicitly in EQ. 11 to avoid numerical stability issues that can arise from large values of γ. The function advect($\vec{u}^n, \Delta t, \vec{u}^n$), included in EQ. 9, integrates the homogeneous advection equation:

$$\frac{\partial q}{\partial t} + (\vec{u}\cdot\nabla)q = 0 \qquad \text{(EQ. 12)}$$

In some embodiments, EQ. 12 is integrated using a semi-Lagrangian advection scheme. The integration of EQ. 12 using a semi-Lagrangian advection scheme is discussed in a separate section, below.

Since EQ. 1 specifies that the fluid being modeled is incompressible, the velocity field of the fluid is, by definition, divergence-free. Imposing the condition of zero divergence on EQ. 10 results in a Poisson equation for the value of pressure (p):

$$\nabla^2 p = \frac{\rho}{\Delta t}\nabla\cdot\vec{u}^{(0)} \qquad \text{(EQ. 13)}$$

EQ. 13 may be referred to as the pressure projection equation because the condition imposed by EQ. 13 projects the intermediate velocity $\vec{u}^{(1)}$ onto the space of solutions that satisfy, or at least approximately satisfy, the requirement of zero divergence as specified by EQ. 1.

Once the value of velocity field $\vec{u}^{n+1}$ is determined, the transport equation for scalar fields $\varphi_i^n \approx \varphi(\vec{x}, n\Delta t)$ is determined by:

$$\varphi_i^{(0)} = \varphi_i^n \qquad \text{(EQ. 14))},$$

$$\varphi_i^{(1)} = \text{advect}(\varphi_i^{(0)}, \Delta t, \vec{u}^{n+1}) + \Delta t E_i \qquad \text{(EQ. 15)}$$

$$\varphi_i^{n+1} = \varphi_i^{(1)} + \mu\Delta t\nabla^2\varphi_i^{n+1} - \gamma\Delta t\varphi_i^{n+1} \qquad \text{(EQ. 16)}$$

Equations 14-16 are solved independently for each scalar field $\varphi_i$ that is being modeled by FLUX process 300. The diffusive and dissipative terms in EQS. 11 and 16 are treated implicitly using scalar coefficients $\mu_i$ and $\gamma_i$, meaning that these effects are included as a function of the unknown solution at the new time interval $\varphi_i^{n+1}$. The implicit treatment of diffusion and dissipation in the time integration of EQ. 16 is beneficial in at least two ways: First, the implicit treatment promotes stability in the time integration of EQ. 16, thereby allowing the time integration of EQ. 16 to cover a larger amount of total time interval t (as compared to a time integration of EQ. 16 that treats the effects of the diffusion and dissipation parameters explicitly using the known values $\varphi_i^n$). Second, the inclusion of diffusion into EQ. 16 produces excellent correspondence between high- and low-resolution simulations. That is, low resolution simulations, which run at almost interactive speeds, can be used to fine-tune the motion of an animated special effect. Subsequently, a high-resolution simulation may be performed, and the animated special effect produced by the final simulation would correspond to the overall motion of the animated special effect that was simulated at a lower resolution.

At step 370, FLUX process 300 stores the value of each scalar field $\varphi_i^{n+1}$ determined at step 360 for use by other processes in the overall animation system.

2. Additional Influences: Sources, Collisions, and Divergence Control Fields

Turning back to step 330, FLUX process 300, at step 330, may access sets of volumetric data that represent other types of influences to be considered by FLUX process 300. For example, at step 330, FLUX process 300 may access volumetric data representing a source term for one or more scalar fields in the animated special effect. As another example, at step 330, FLUX process 300 may access volumetric data representing a divergence control field that alters the appearance of specific portions of an animated special effect. Turning to step 350, FLUX process 300 may access, at step 350, volumetric data that represent the collision of the fluid with another animated object. Sources, collisions, and divergence control fields are discussed below, in turn.

A source volume may be used to force a scalar field $\varphi_i$ to take on specific values over time. A source volume may be used to define initial formation of an animated special effect. For example, the formation of a dust cloud might be the result of the impact between a falling building and the ground. The area of contact between the falling building and the ground may be defined as a source of the dust cloud.

In the context of FLUX process 300, a source may be represented as volumetric data containing two scalar fields $S_i$ and $\alpha_i$. $S_i$ represents the value of the source field, and $\alpha_i$ represents the amount of influence exerted by the source field $S_i$ over a scalar field $\varphi_i$ (i.e., an animated special effect). If $\alpha_i$ is not specified explicitly by an animation artist, FLUX process 300 may determine $\alpha_i$ by normalizing $S_i$:

$$\alpha_i = \frac{S_i}{\|S_i\|} \qquad \text{(EQ. 17)}$$

Collisions are useful in the context of computer animation because an animated special effect may interact with other animated objects in an animation scene. For example, an animated dust cloud may be channeled through a narrow street as defined by adjacent buildings (as illustrated in FIG. 1). An animated dust cloud may also need to deform around an animated character that is running through the animated dust cloud.

In the context of FLUX process 300, a collision may be represented by volumetric data containing a collision velocity field $\vec{v}$ and a collision mask α (a scalar field). Collision velocity field $\vec{v}$ represents the desired velocity at a given coordinate of the animation domain. The scalar field α represents collision strength, meaning the amount of influence exerted by the collision velocity field $\vec{v}$ over velocity field $\vec{u}$. If α is zero, a local velocity of $\vec{u}$ is not modified. If α is 1, a local velocity of $\vec{u}$ is completely replaced with a local velocity from $\vec{v}$.

Sources and collisions are incorporated at into the fluid dynamics modeling of FLUX process 300 at specific stages in step 360. Source information is incorporated into EQ. 14 by modifying the initial state of the scalar prior to advection:

$$\varphi_i^{(0)} = \text{composite}(\varphi_i^n, \alpha_i, S_i) \qquad \text{(EQ. 18)}$$

Collision information is incorporated into the pressure projection equation (EQ. 13):

$$\nabla^2 p = \frac{\rho}{\Delta t} \nabla \cdot \text{composite}(\vec{u}^{(0)}, \alpha, \vec{U}_{coll}) \quad \text{(EQ. 19)}$$

The function of composite(u,α,v) represents, generally, a linear combination of u and v. The table below provides examples of linear combinations that may be produced using composite(u,α,v):

TABLE 1

| Mode | Operation |
| --- | --- |
| over | u = (1 − α)u + αv |
| set | u = αv |
| add | u = u + αv |
| max | u = max(u, αv) |
| max_add | u = max(u, αv) + αv |
| min | u = min(u, αv) |
| min_add | u = min(u, αv) + αv |

The specific mode of composite(u,α,v) to be used during step 360 of FLUX process 300 may be defined by an animation artist during the creation of a source volume and/or a collision volume.

Figure 4:
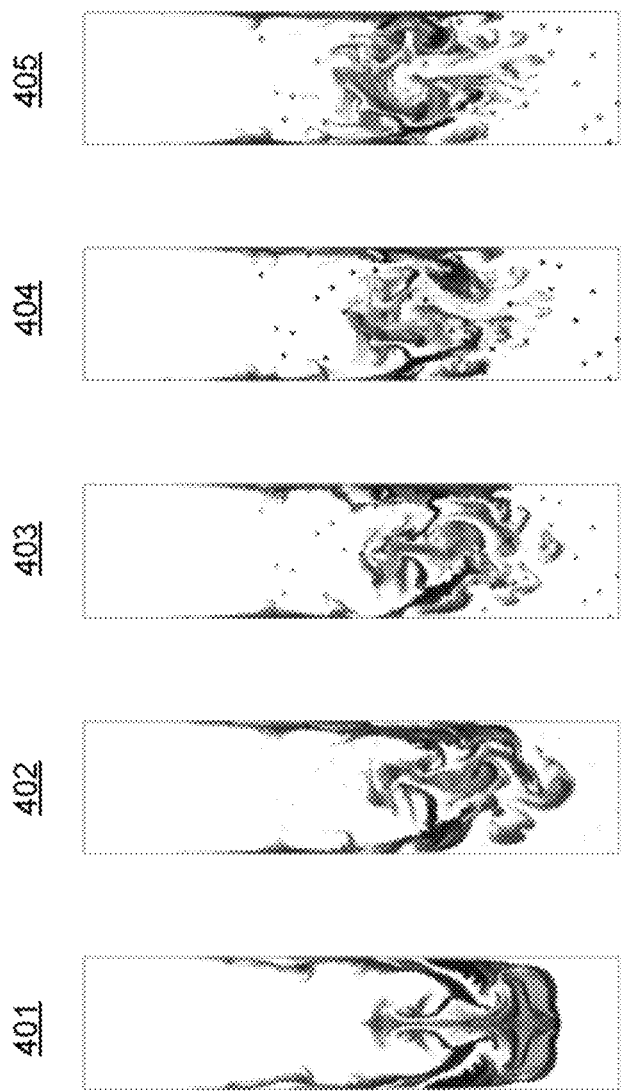
FIG. 4 is a screen shot depicting exemplary animation scenes produced using an embodiment of the FLUX system.

FIG. 4 depicts exemplary animation scenes 401-405 produced using FLUX process 300 (FIG. 3). Animation scenes 401-405 depict a sphere of heavy fluid falling under gravity. A value for collision mask (α) is chosen to be non-zero at a random set of positions and is varied in strength from zero (in scene 401) to 1 (in scene 405). As illustrated by animation scenes 401-405, the visual appearance of the animated fluid may be adjusted by varying the magnitude of α. The resulting visual appearance mimics the use of screens or wires to inject turbulence in laboratory experiments.

Further, an animation artist may apply processing algorithms to modify the shape and magnitude of the collision mask because collision mask (α) is represented as volumetric data. The ability to modify a collision mask provides animation artists with additional control over the visual appearance of an animated special effect.

Figure 5:
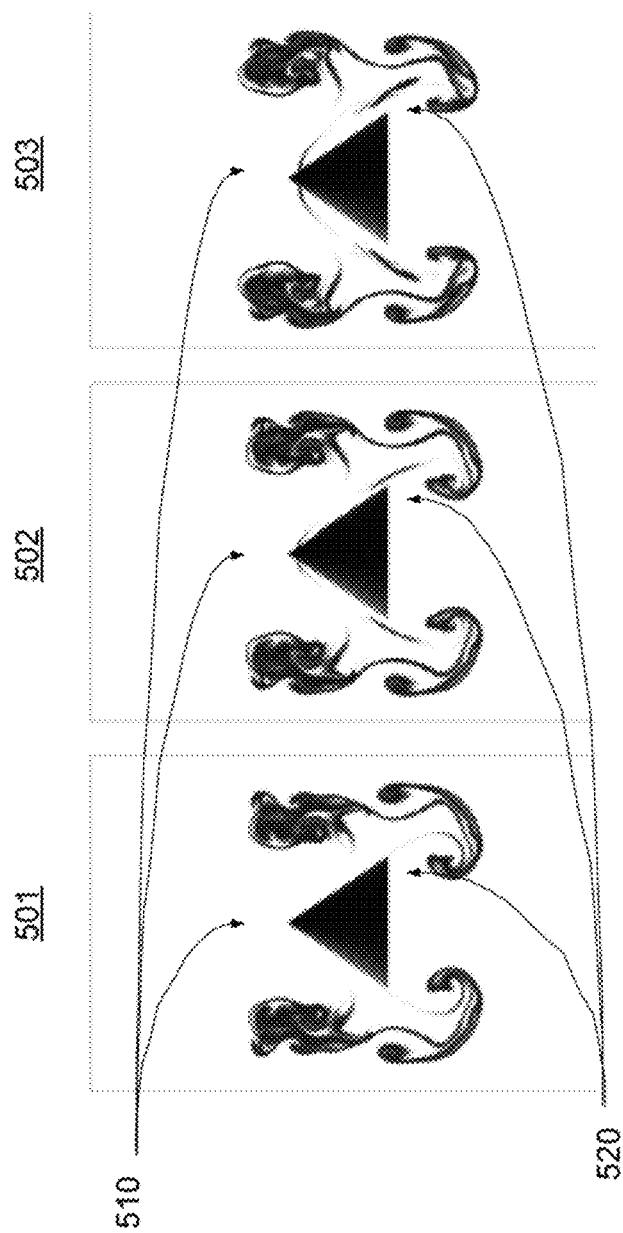
FIG. 5 is a screen shot depicting exemplary animation scenes produced using an embodiment of the FLUX system.

FIG. 5 depicts additional exemplary animation scenes 501-503 produced using FLUX process 300 (FIG. 3). Animation scenes depict a sphere of heavy fluid 520 interacting with sharp cone 510. A blur of radius r is applied to the simulation of scenes 502-503 in order to soften the collision of heavy fluid 520 with sharp cone 510. In scene 502, a blur of r=1 is applied to α. In scene 503, a blur of r=2 is applied to α. No blurring is applied in scene 501. As illustrated by scene 503, a blur of r=2 results in a higher quantity of heavy fluid 520 appearing adjacent to sharp cone 510. That is, scene 503 shows a softer collision as compared to scene 501.

An explicit divergence control field $D(\vec{x},t)$ may also be used by an animation artist to introduce local sources and/or sinks of velocity for an animated special effect, thereby providing an animation artist with additional control over the visual appearance of the animated special effect. The addition of a divergence control field $D(\vec{x},t)$ relaxes the requirement, as discussed above and as reflected in EQ. 13, that the velocity field $\vec{u}(\vec{x},t)$ of an animated special effect be strictly divergence-free.

Divergence control field $D(\vec{x},t)$ may be incorporated into EQ. 10, causing EQ. 13 to be rewritten as:

$$\nabla^2 p = \frac{\rho}{\Delta t}[\nabla \cdot \text{composite}(\vec{u}^{(0)}, \alpha, \vec{U}_{coll}) - D^n] \quad \text{(EQ. 20)}$$

3. Additional Influences: Volumetric Combustion and Turbulence

Figure 6:
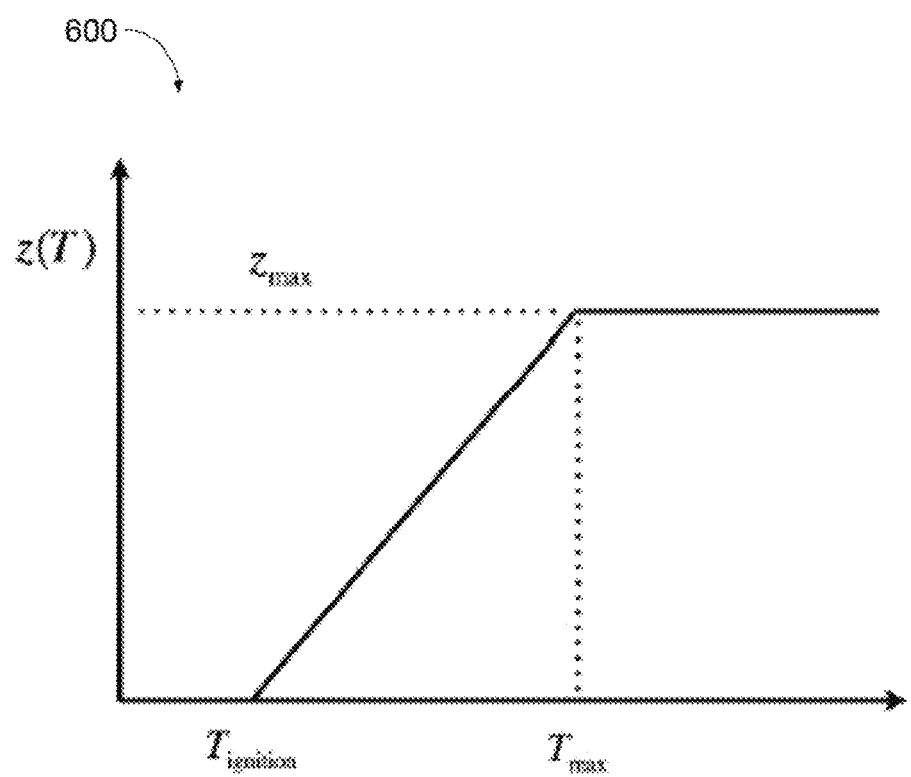
FIG. 6 is a graph depicting burn rate of fuel as a function of temperature in the volumetric combustion model of the FLUX system.
Figure 7:
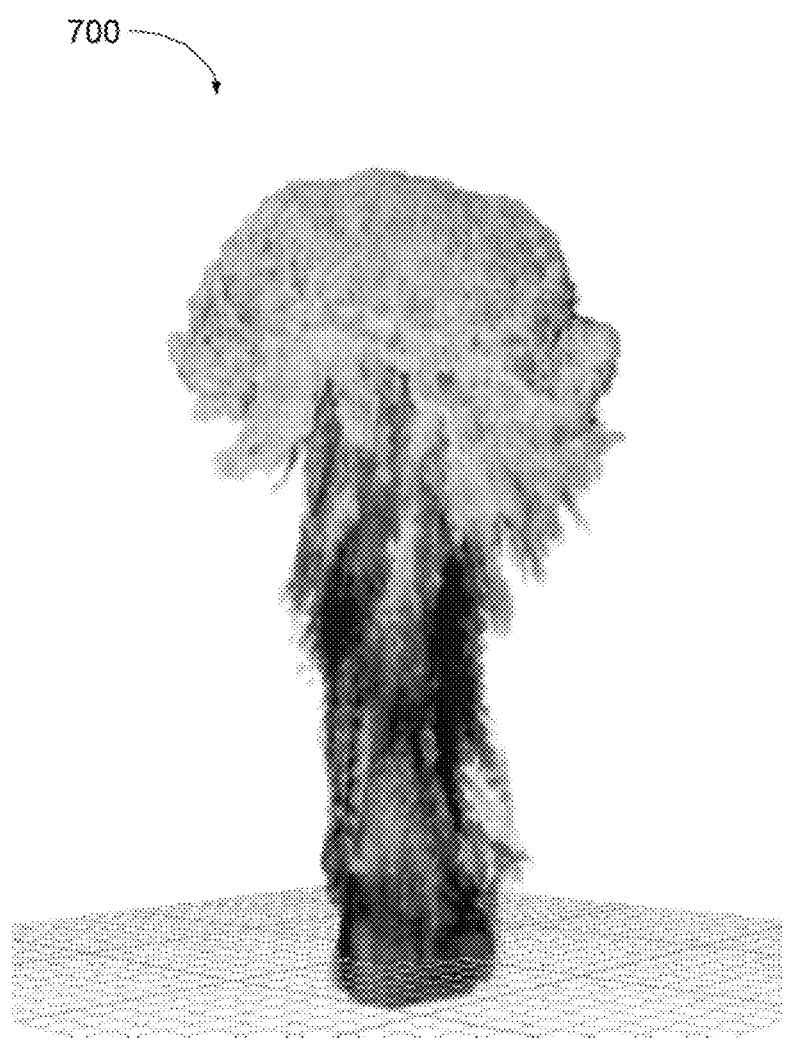
FIG. 7 is a screen shot depicting an exemplary animation scene produced using an embodiment of the FLUX system.

In some embodiments, the FLUX system utilizes a divergence control field $D(\vec{x},t)$ in order to provide a volumetric combustion model for animating fireballs, flames, and other explosions. FIG. 7 depicts an exemplary animation scene with fire ball 700 that is animated using the volumetric combustion model. Similar to FLUX process 300 (FIG. 3) discussed above, scalar fields $\varphi_i$ representing temperature $T=\varphi_{heat}$, smoke $s=\varphi_{smoke}$, and fuel $F=\varphi_{fuel}$ may be accessed by some embodiments of the FLUX system. The volumetric combustion model allows an animation artist to define an ignition temperature ($T_{ignition}$) and a temperature ($T_{max}$) at which the maximum rate of the burning of fuel ($Z_{max}$) is achieved. For temperatures between $T_{ignition}$ and $T_{max}$ the burn rate (z(T)) is a linear function of temperature T. FIG. 6 depicts the relationship 600 among $T_{ignition}$, $T_{max}$, $Z_{max}$, and z(T).

At each grid point where $T>T_{ignition}$ and F>0, fuel (F) is reduced by an amount $\Delta F=\min(F, \tilde{z}\Delta t)$. Smoke concentration $s=\varphi_{smoke}$ and temperature $T=\varphi_{heat}$ are increased by an amount, specified by an animation artist, that is proportional to ΔF. The divergence control field $D(\vec{x},t)$ is increased by an amount that is proportional to ΔF/Δt. The divergence control field $D(\vec{x},t)$ is incorporated into EQ. 13 as discussed above with respect to divergence control fields. Further, the smoke ($\varphi_{smoke}$), temperature ($\varphi_{heat}$) and fuel ($\varphi_{fuel}$) fields, in addition to being modified by the combustion model, are also advected in space by the fluid velocity.

In some embodiments, the FLUX system also provides turbulence models that can be used by an animation artist in order to introduce additional animation details. Specifically, the FLUX system may utilize the vorticity confinement model as described in Steinhoff, J. and Underhill, D. Modification of Euler equations for "vorticity confinement": application to the computation of interacting vortex rings. Phys. Fluids. 6, 8 (1994), 2738-2744. The vorticity confinement model is based on the observation that a stirring force can be computed based on the fluid vorticity needed to maintain turbulent motion, where the fluid vorticity is based on:

$$\vec{\omega} = \nabla \times \vec{u} \quad \text{(EQ. 21)}$$

A set of unit vectors that are oriented along the gradient of vorticity magnitude, $\|\vec{\omega}\|$, may be constructed based on EQ. 21:

$$\vec{N} = \frac{\nabla \|\vec{\omega}\|}{\|\nabla \|\vec{\omega}\|\|} \quad \text{(EQ. 22)}$$

A force parameter may be constructed from the cross product of EQ. 22 and the local vorticity vector:

$$\vec{f}_{conf} = \epsilon \vec{N} \times \vec{\omega} \quad \text{(EQ. 23)}$$

where ε is a parameter, provided by an animation artist, to control the contribution from the turbulence model, and $\vec{f}_{conf}$ is applied to EQ. 2 whenever ε>0.

In addition to the vorticity confinement model, some embodiments of the FLUX system may also utilize a divergence-free procedural noise model during advection in order to introduce turbulence into a velocity field. A vector potential $\vec{\psi}(\vec{x},t)$ is computed by summing several octaves of noise:

$$\vec{\psi}(\vec{x}, t) = \sum_{p=1}^{m} A_p \vec{N}(2^p(k\vec{x} - \omega t)) \qquad \text{(EQ. 24)}$$

where $\vec{N}$ is a vector-valued noise function and k and ω are spatial and temporal noise frequencies provided by an animation artist.

For example, vector $\vec{N}$ may be a wavelet noise function that is pre-computed in a $128^3$ tile and sampled at three widely-separated positions in an index space. During the solution of EQ. 12, velocity field $\vec{u}$ is replaced with:

$$\vec{u}_{turb} = \vec{u} + \nabla \times \vec{\psi} \qquad \text{(EQ. 25)}$$

The procedural component of velocity field $\vec{u}_{turb}$ is divergence-free because, by construction, the equation $\nabla \cdot (\nabla \times \vec{\psi}) = 0$ must hold true for any vector field $\vec{\psi}$. Further, the amplitude function $A_p$ modulates the noise in space and time and can be selected from a number of dynamic fields by an animation artist. Any scalar field $\varphi_i$ may be used to modulate noise with a power-law decay rate, $A_p = a^p |\varphi_i|$, where $a = 2^{-5/6}$. Other supported amplitude functions include velocity magnitude, vorticity magnitude, and estimated sub-grid energy.

4. Semi-Lagrangian Advection Schemes

As discussed above, EQ. 12 may be integrated using a semi-Lagrangian advection scheme. Semi-Lagrangian advection schemes share the common characteristic that each can be made unconditionally stable with respect to time step Δt. Semi-Lagrangian advection schemes that may be utilized by the FLUX process 300 include: First order semi-Lagrangian, 2-stage, 3-stage, and 4-stage Runge-Kutta schemes, and a modified MacCormack scheme. At step 360, FLUX process 300 may select a certain semi-Lagrangian advection scheme based on the quality or resolution of the animated special effect that is to be modeled. Further, because the sets of volumetric data accessed by FLUX process 300 are discretized by a common grid, a single interface can be implemented for the different schemes.

Table 2 specifies the exemplary uses of semi-Lagrangian advection schemes based on the visual quality that is to be achieved.

TABLE 2

| Quality | Method |
| --- | --- |
| Low | first order semi-Lagrangian |
| Medium | 3-stage Runge-Kutta |
| High | Modified MacCormack |

The semi-Lagrangian advection schemes of Table 2 sample the velocity field ($\vec{u}$) and the advected field (q) of an animated special effect at arbitrary points within the FLUX domain. Let $q_{ijk}^n$ represent the value of $q^n$ at a grid point $\vec{x}_{ijk}$ of a volume, and let $q^n(\vec{x})$ represent the interpolated value at an arbitrary position $\vec{x}$ of the volume. The 3-stage Runge-Kutta advection scheme may be implemented as:

$$k_1 = \vec{u}(\vec{x}_{ijk}) \qquad \text{(EQ. 26)}$$

$$k_2 = \vec{u}\left(\vec{x}_{ijk} - \frac{1}{2}\Delta t k_1\right) \qquad \text{(EQ. 27)}$$

$$k_3 = \vec{u}\left(\vec{x}_{ijk} - \frac{3}{4}\Delta t k_2\right) \qquad \text{(EQ. 28)}$$

$$q_{ijk}^{n+1} = q^n\left(\vec{x}_{ijk} - \Delta t \frac{2k_1 + 3k_2 + 4k_3}{9}\right) \qquad \text{(EQ. 29)}$$

where $k_1$, $k_2$, $k_3$ are velocities sampled at intermediate positions using tri-linear interpolation.

The modified MacCormack advection scheme listed in Table 2 refers to a specific implementation of the scheme described in Selle, A. Fedkiw, An unconditionally stable MacCormack method. Journal of Scientific Computing 35 (2008), 350-371. The modified MacCormack advection scheme integrates the homogenous advection equation with a local min-max limiter (required for stability) and reverts to first-order semi-Lagrangian advection when a point of origin for the advection falls outside the FLUX domain. The modified MacCormack advection scheme introduces predominantly dispersive (e.g., movement) errors, rather than diffusive (e.g., blurring) errors. In the context of computer animation, dispersive errors are more visually forgiving than diffusive errors because the blurring of an animated special effect (i.e., diffusive errors) is more easily noticed by a viewer than inaccuracies in the motion (i.e., dispersive errors) of, for example, a dust cloud.

One advantage of the advection schemes discussed in Table 2 is that they are unconditionally stable and can run with large values of Δt. This allows an animation artist to choose between slow but accurate simulations that might require small values of Δt and fast but inaccurate simulations with large values of Δt.

The amount of processing time required by FLUX process 300 to model an animated special effect may be shortened by increasing the value of Δt. A CFL number may be used to quantify the non-dimensional distance of advection by a field during a single time step Δt:

$$CFL = \frac{\Delta t}{h} U_{max} \qquad \text{(EQ. 30)}$$

where $U_{max} = \|\vec{u}\|_\infty$ is the maximum fluid velocity.

While an accurate fluid simulation generally requires CFL to equal 1 approximately, low quality simulations performed with FLUX process 300 may have CFL=approximately 15 to 75. A high CFL value, which corresponds to a large time interval Δt, reduces the amount of computation time required to integrate the motion of an animated special effect. Since EQ. 25 correlates CFL with Δt, at step 340, FLUX process 300 may dynamically adjust the time step Δt based on a target CFL number that is provided by an animation artist in order to optimize the simulation time required to achieve a particular level of quantity in a resulting animated special effect.

Figure 8:
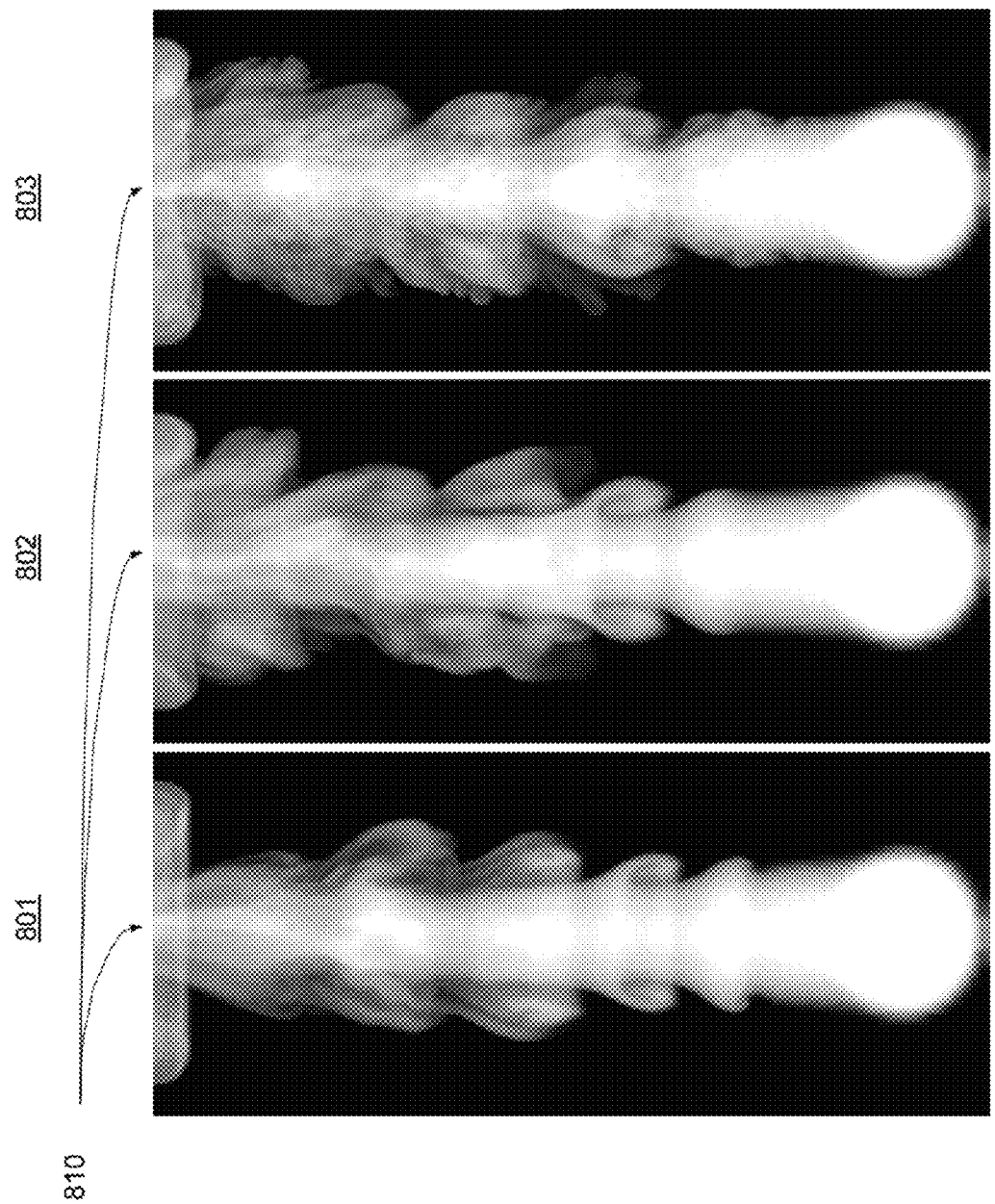
FIG. 8 is a screen shot depicting an exemplary animation scene produced using an embodiment of the FLUX system.

FIG. 8 depicts exemplary animation scenes 801-803 with a rising smoke plume 810. Scene 801 is modeled with a low quality advection scheme, scene 802 is modeled at medium quality, and scene 803 is modeled at high quality. At an exemplary resolution of N=304×768×304 grid points, the modeling of the smoke plume 810 in scene 801 (i.e., low quality) requires 4.5 seconds for each output volume. The modeling of scene 802 (i.e., medium quality) requires 6.4 seconds for each output volume, and the modeling of 803 (i.e., high quality) also requires 6.4 seconds for each output volume.

5. Computation Algorithm

Note that EQS. 11, 13, 16, and 20 can be expressed in the form:

$$(\nabla^2 - \lambda^2)\varphi = f \quad \text{(EQ. 31)}$$

where $\lambda^2$ is a constant.

A Helmholtz solver may be used to solve an equation in the form of EQ. 31. During the computerized solution of an equation that is in the form of EQ. 31, a significant number of computation cycles are spent in determining the solution to the left-hand portion of the equation. The left-hand portion of EQ. 31 is computationally expensive because its solution requires the simultaneous computation of voxel data at neighboring grid points in a set of volumetric data. Further, the influences on an animated special effect described above (e.g., collisions and sources) may be incorporated into the right-hand portion of EQ. 31. Thus, the selection of an optimal computerized method to solve EQ. 31 impacts the overall performance of FLUX process 300.

The optimal computerized method to solve EQ. 31 may depend on the type of computing system that is being used to carry out FLUX process 300. Table 3 provides a comparison of serial and parallel algorithms for solving an equation in the form of EQ. 18 involving volumetric data with a total of N grid points. A type D (direct) algorithm requires a fixed number of operations to produce a solution of a given numerical precision. In contrast, a type I (indirect) algorithm refines its solution during each successive iteration of the algorithm.

TABLE 3

| Algorithm | Type | Serial Time | PRAM Time | Storage | Processors |
|---|---|---|---|---|---|
| Dense LU | D | $N^3$ | N | $N^2$ | $N^2$ |
| Band LU | D | $N^2$ | N | N | N |
| Jacobi | I | $N^2$ | N | N | N |
| Sparse LU | D | $N^{3/2}$ | $N^{1/2}$ | N log N | N |
| CG | I | $N^{3/2}$ | $N^{1/2}$ log N | N | N |
| SOR | I | $N^{3/2}$ | $N^{1/2}$ | N | N |
| FFT | D | N log N | log N | N | N |
| Multigrid | I | N | $(\log N)^2$ | N | N |
| Lower Bound | | N | log N | | |

An observation is made, based on Table 3, that the optimal computerized method to be used with a serial processing computing system is the Multigrid algorithm, because the amount of time required by the Multigrid algorithm to solve EQ. 18 on a serial processing computing system is on the order of O(N). A further observation is made that the optimal computerized method to be used with a parallel processing computing system is an FFT-based algorithm, because the amount of time required by an FFT-based algorithm to solve EQ. 18 on a parallel processing computing system is on the order of O(log N). Further, a FFT-based algorithm may be used with a multi-processor computing system with shared memory to achieve superior performance.

Figure 9:
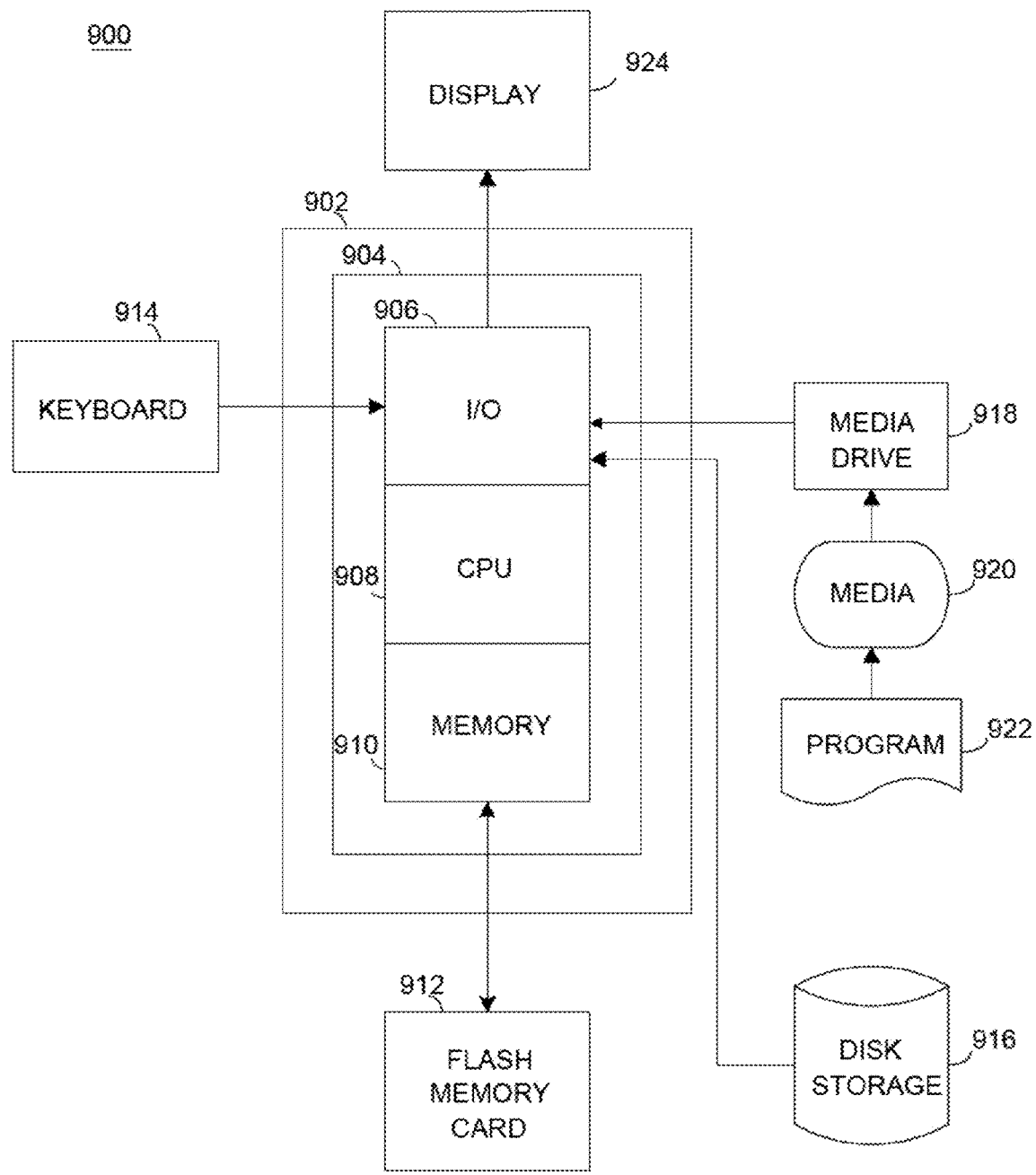
FIG. 9 is a block diagram depicting an exemplary FLUX system.

FIG. 9 depicts computing system 900 with a number of components that may be used to perform the above-described processes. The main system 902 includes a motherboard 904 having an I/O section 906, one or more central processing units (CPU) 908, and a memory section 910, which may have a flash memory card 912 related to it. The I/O section 906 is connected to a display 924, a keyboard 914, a disk storage unit 916, and a media drive unit 918. The media drive unit 918 can read/write a computer-readable medium 920, which can contain programs 922 and/or data.

At least some values based on the results of the above-described processes can be saved for subsequent use. Additionally, a computer-readable medium can be used to store (e.g., tangibly embody) one or more computer programs for performing any one of the above-described processes by means of a computer. The computer program may be written, for example, in a general-purpose programming language (e.g., Pascal, C, C++, Java) or some specialized application-specific language.

Although only certain exemplary embodiments have been described in detail above, those skilled in the art will readily appreciate that many modifications are possible in the exemplary embodiments without materially departing from the novel teachings and advantages of this disclosure. For example, aspects of embodiments disclosed above can be combined in other combinations to form additional embodiments. Accordingly, all such modifications are intended to be included within the scope of this technology.

What is claimed is:

1. A non-transitory computer-readable storage medium having computer-executable instructions for animating a special effect in a computer animation, comprising instructions for:
    accessing a first set of volumetric data representing the special effect in an initial state;
    accessing a plurality of sets of volumetric data, including:
        a set of volumetric data representing a velocity field, wherein the velocity field describes advection of the special effect,
        a set of volumetric data representing a temperature field, wherein the temperature field corresponds to temperatures of the special effect or temperatures around the special effect,
        a set of volumetric data representing a density field, wherein the density field corresponds to densities of the special effect,
        a set of volumetric data representing a source of influence on the special effect, wherein the set of volumetric data representing the source of influence comprises a scalar source field representing a value of the source and a scalar blending field representing a degree of influence of the source on the special effect, and wherein the degree of influence includes a parameter provided by a user, and
        a set of volumetric data representing a collision with the special effect, wherein the set of volumetric data representing the collision comprises a collision velocity field and a collision influence field, and wherein the collision influence field represents degrees to which values of corresponding collision velocity fields should be applied to the special effect;
    determining a second set of volumetric data representing the special effect in a new state,
        wherein the second set of volumetric data is determined using the first set of volumetric data, the set of volumetric data representing the velocity field, the set of volumetric data representing the temperature field, the set of volumetric data representing the density field, the set of volumetric data representing the source of influence, the set of volumetric data representing the collision, and the incompressible Navier-Stokes equations; and storing the second set of volumetric data.

2. The non-transitory computer-readable storage medium of claim 1, wherein the special effect is a dust cloud, a smoke cloud, or an explosion.

3. The non-transitory computer-readable storage medium of claim 1, wherein:

the first set of volumetric data comprises a plurality of voxels, and a given voxel of the first volumetric data comprises a scalar value that represents presence of an element of the special effect at a given coordinate of an animation domain.

4. The non-transitory computer-readable storage medium of claim 1, wherein:

the second set of volumetric data is further determined using a linear combination of the scalar source field, the scalar blending field, and the first set of volumetric data.

5. The non-transitory computer-readable storage medium of claim 4, wherein:

the linear combination is used in place of the first set of volumetric data when determining the second set of volumetric data.

6. The non-transitory computer-readable storage medium of claim 1, further comprising:

accessing another set of volumetric data representing the special effect in the initial state; and determining, based on a user's selection, the first set of volumetric data, wherein the first set of volumetric data is a subset of the another set of volumetric data.

7. The method of claim 1, wherein the degree of influence is a non-zero, intermediate degree of influence.

8. The method of claim 1, wherein the second set of volumetric data is determined using an FFT-based algorithm on a parallel processing computing system.

9. A computer-implemented method for animating a special effect in a computer animation, the method comprising:

accessing a first set of volumetric data representing the special effect in an initial state;

accessing a plurality of sets of volumetric data, including:
a set of volumetric data representing a velocity field, wherein the velocity field describes advection of the special effect,
a set of volumetric data representing a temperature field, wherein the temperature field corresponds to temperatures of the special effect or temperatures around the special effect,
a set of volumetric data representing a density field, wherein the density field corresponds to densities of the special effect,
a set of volumetric data representing a source of influence on the special effect, wherein the set of volumetric data representing the source of influence comprises a scalar source field representing a value of the source and a scalar blending field representing a degree of influence of the source on the special effect, and wherein the degree of influence includes a parameter provided by the user, and
a set of volumetric data representing a collision with the special effect, wherein the set of volumetric data representing the collision comprises a collision velocity field and a collision influence field, and wherein the collision influence field represents degrees to which values of corresponding collision velocity fields should be applied to the special effect;

determining a second set of volumetric data representing the special effect in a new state,
wherein the second set of volumetric data is determined using the first set of volumetric data, the set of volumetric data representing the velocity field, the set of volumetric data representing the temperature field, the set of volumetric data representing the density field, the set of volumetric data representing the source of influence, the set of volumetric data representing the collision, and the incompressible Navier-Stokes equations; and storing the second set of volumetric data.

10. The computer-implemented method of claim 9, wherein:

the first set of volumetric data comprises a plurality of voxels, and a given voxel of the first volumetric data comprises a scalar value that represents presence of an element of the special effect at a given coordinate of an animation domain.

11. The computer-implemented method of claim 9, wherein:

the second set of volumetric data is further determined using a linear combination of the scalar source field, the scalar blending field, and the first set of volumetric data.

12. The computer-implemented method of claim 11, wherein:

the linear combination is used in place of the first set of volumetric data when determining the second set of volumetric data.

13. The computer-implemented method of claim 9, further comprising:

accessing another set of volumetric data representing the special effect in the initial state; and determining, based on a user's selection, the first set of volumetric data, wherein the first set of volumetric data is a subset of the another set of volumetric data.

14. A system for animating a special effect in a computer animation, the system comprising one or more computer processors configured to:

access a first set of volumetric data representing the special effect in an initial state;

access a plurality of sets of volumetric data, including:
a set of volumetric data representing a velocity field, wherein the velocity field describes advection of the special effect,
a set of volumetric data representing a temperature field, wherein the temperature field corresponds to temperatures of the special effect or temperatures around the special effect,
a set of volumetric data representing a density field, wherein the density field corresponds to densities of the special effects,
a set of volumetric data representing a source of influence on the special effect, wherein the set of volumetric data representing the source of influence comprises a scalar source field representing a value of the source and a scalar blending field representing a degree of influence of the source on the special effect, and wherein the degree of influence is a parameter provided by the user, and
a set of volumetric data representing a collision with the special effect, wherein the set of volumetric data representing the collision comprises a collision velocity field and a collision influence field, and wherein the collision influence field represents degrees to which values of corresponding collision velocity fields should be applied to the special effect;

determine a second set of volumetric data representing the special effect in a new state, wherein the second set of volumetric data is determined using the first set of volumetric data, the set of volumetric data representing a velocity field, the set of volumetric data representing the temperature field, the set of volumetric data representing the density field, the set of volumetric data representing the source of influence, the set of volumetric data representing the collision, and the incompressible Navier-Stokes equations; and store the second set of volumetric data.

15. The system of claim 14, wherein:

the first set of volumetric data comprises a plurality of voxels, and a given voxel of the first volumetric data comprises a scalar value that represents presence of an element of the special effect at a given coordinate of an animation domain.

16. The system of claim 14, wherein:

the second set of volumetric data is further determined using a linear combination of the scalar source field, the scalar blending field, and the first set of volumetric data.

17. The system of claim 16, wherein:

the linear combination is used in place of the first set of volumetric data when determining the second set of volumetric data.

18. The system of claim 14, wherein the one or more computer processors are further configured to:

access another set of volumetric data representing the special effect in the initial state; and determine, based on a user's selection, the first set of volumetric data, wherein the first set of volumetric data is a subset of the another set of volumetric data.

* * * * *